United States Patent
Frolo

Patent Number: 6,155,639
Date of Patent: Dec. 5, 2000

[54] ARRANGEMENT OF A MOTOR VEHICLE SEAT CUSHION ON A SUPPORT

[75] Inventor: Ludovic N. Frolo, Nogent sur Vernisson, France

[73] Assignee: Cesa-Compagnie Europeenne de Siegea Pour Automobiles, Levallois-Perret, France

[21] Appl. No.: 09/295,106

[22] Filed: Apr. 21, 1999

[30] Foreign Application Priority Data

Apr. 22, 1998 [FR] France ................................. 98 05030

[51] Int. Cl.⁷ ....................................... B60N 2/02
[52] U.S. Cl. ..................... 297/331; 297/336; 296/65.03
[58] Field of Search .................... 297/313, 316, 297/336, 337, 331; 296/65.03

[56] References Cited

U.S. PATENT DOCUMENTS

| | | | |
|---|---|---|---|
| 4,512,609 | 4/1985 | Parsson | 297/331 |
| 5,558,386 | 9/1996 | Tilly et al. | 297/336 |
| 5,662,368 | 9/1997 | Ito et al. | 297/336 |
| 5,795,023 | 8/1998 | Kayumi | 297/331 |
| 5,975,611 | 11/1999 | Hoshihara et al. | 297/336 X |

FOREIGN PATENT DOCUMENTS

| | | |
|---|---|---|
| 041 411 | 4/1981 | European Pat. Off. . |
| 580 315 | 1/1994 | European Pat. Off. . |
| 1 170 184 | 1/1959 | France . |
| 2 048 895 | 3/1971 | France . |
| 35 32 374 | 3/1987 | Germany . |
| 39 13 529 | 11/1989 | Germany . |
| 196 51 115 | 6/1997 | Germany . |

OTHER PUBLICATIONS

Patent Abstracts of Japan, vol. 97, No. 10, Oct. 31, 1997 & JP 09 142191 A (Delta Kogyo Co., Ltd). Jun. 3, 1997.

*Primary Examiner*—Anthony D. Barfield
*Attorney, Agent, or Firm*—Sughrue, Mion, Zinn, Macpeak & Seas, PLLC

[57] ABSTRACT

The seat cushion (14) and the support (20) have respective ends articulated together by an assembly (26) forming a hinge with two essentially horizontal axes of articulation (Y1, Y2) so as to allow the seat cushion (14) to be pivoted between a normal position of use in which it is folded down on the support (20), and a tipped-up position in which it frees its normal space. The arrangement comprises members (44, 46) for retaining the seat cushion (14) in the normal position in the event of this seat cushion (14) experiencing an impact which would tend to lift its articulation end with respect to the articulation end of the support (20). As a preference, this retaining member comprise a hook (46) borne by the articulation end of the seat cushion (14) and cooperating with a crossmember (44) delimiting the articulation end of the support (20).

10 Claims, 6 Drawing Sheets

6,155,639

ARRANGEMENT OF A MOTOR VEHICLE SEAT CUSHION ON A SUPPORT

BACKGROUND OF THE INVENTION

The present invention relates to an arrangement a motor vehicle seat cushion on a support.

There is already known in the state of the art an arrangement of a motor vehicle seat cushion on a support, of the type in which the seat cushion and the support have respective ends articulated together by an assembly forming a hinge with two essentially horizontal axes of articulation so as to allow the seat cushion to be pivoted between a normal position of use in which it is folded down on the support, and a tipped-up position in which it frees its normal space.

An arrangement of this type is particularly applicable to a rear bench seat comprising a backrest articulated so that it can be moved between an upright position in which the bench seat is in use and a folded-down position in which this backrest occupies the space left empty by the seat cushion once the latter is in its tipped-up position.

Usually, the assembly forming a hinge is arranged at the front of the seat cushion and the latter is kept in its normal position by an appropriate location, with respect to the centre of gravity of the seat cushion, of the axes of articulation of the assembly forming a hinge. In addition, when the seat cushion and the backrest are in the position of use, the padding at the lower end of the backrest cooperates with the padding at the rear end of the seat cushion so as to contribute to keeping this seat cushion in its normal position.

The mechanics of the assembly forming a hinge with two axes of articulation makes it possible, prior to pivoting the seat cushion into its tipped-up position, for the rear end of this seat cushion to be disengaged from She lower end of the backrest by slightly raising the front end of the seat cushion.

In some instances, the location of the axes of articulation of the assembly forming a hinge with respect to the centre of gravity of the seat cushion in the normal position may lead to a risk of the front of the seat cushion accidentally being raised when the vehicle experiences a rear impact. If, in addition, the vehicle experiences a frontal impact immediately after this s rear impact, the seat cushion tends to pivot accidentally towards its tipped-up position.

SUMMARY OF THE INVENTION

The object of the invention is to keep in its normal position of use a seat cushion which is equipped with an assembly forming a hinge with two axes of articulation, and to do so even when the vehicle experiences a rear impact.

To this end, the subject of the invention is an arrangement of the aforementioned type, characterized in that it comprises additional means for retaining the seat cushion in the normal position in the event of this seat cushion experiencing an impact which would tend to lift its articulation end with respect to the articulation end of the support, these retaining means being borne by the articulation ends of the support and of the seat cushion.

According to other features of this arrangement:

the additional retaining means comprise a hook borne by the articulation end of the seat cushion and cooperating with a crossmember delimiting the articulation end of the support;

the additional retaining means also comprise handgrip for disengaging the hook from the crossmember, this handgrip being connected to this hook;

the hook is delimited by a ramp for retracting this hook by cooperation with the crossmember;

the hook is made of plastic.

the hook has the overall shape of an anchor comprising a flexible shank, a retaining arm intended to cooperate with the crossmember and a locking arm intended to cooperate with an additional locking stop borne by the seat cushion, it being possible for the locking arm to move as a result of the flexing of the shank, on the one hand, in a first empty region towards which this locking arm faces, by urging it essentially at right angles to the shank, so as to allow the retaining arm to disengage from the crossmember, and, on the other hand, in a second region of cooperation with the locking stop, towards which this locking arm faces, by cooperation between the crossmember and the retaining arm in the event of an impact so as to keep the retaining arm engaged with the crossmember;

the handgrip is formed as an integral part of a free end of the shank that bears the retaining arm and the locking arm;

the locking stop is formed on an extension of the shank forming a member for attaching the hook to the seat cushion;

the assembly forming a hinge comprises an articulation assembly which has a first end articulated, about a first axis of articulation, to a moving assembly secured to the seat cushion, and a second end articulated, about the second axis of articulation, to a fixed assembly secured to the support;

the moving assembly comprises a yoke which has two branches connected together by a web, the fixed assembly comprises a pair of arms, and the articulation assembly comprises a pair of link rods articulated to the pairs of branches and arms.

BRIEF DESCRIPTION OF THE DRAWINGS

The invention will be better understood on reading the description which will follow, given merely by way of example and made with reference to the appended drawings, in which.

DESCRIPTION OF PREFERRED EMBODIMENTS

Figure 1:
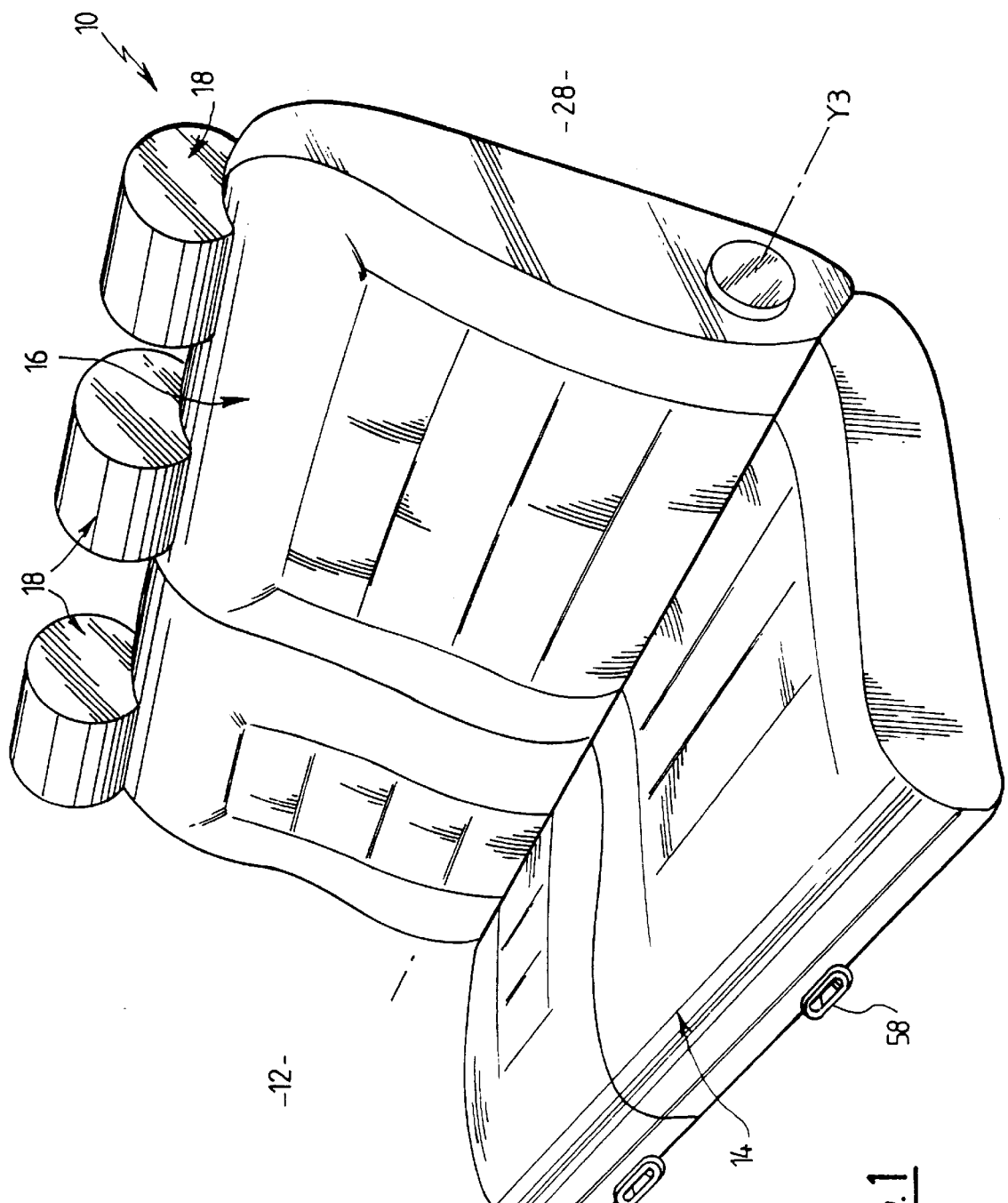
FIG. 1 is a perspective view of a motor vehicle rear bench seat equipped with a seat cushion (in two parts) arranged according to the invention, in the normal position of use.
Figure 2:
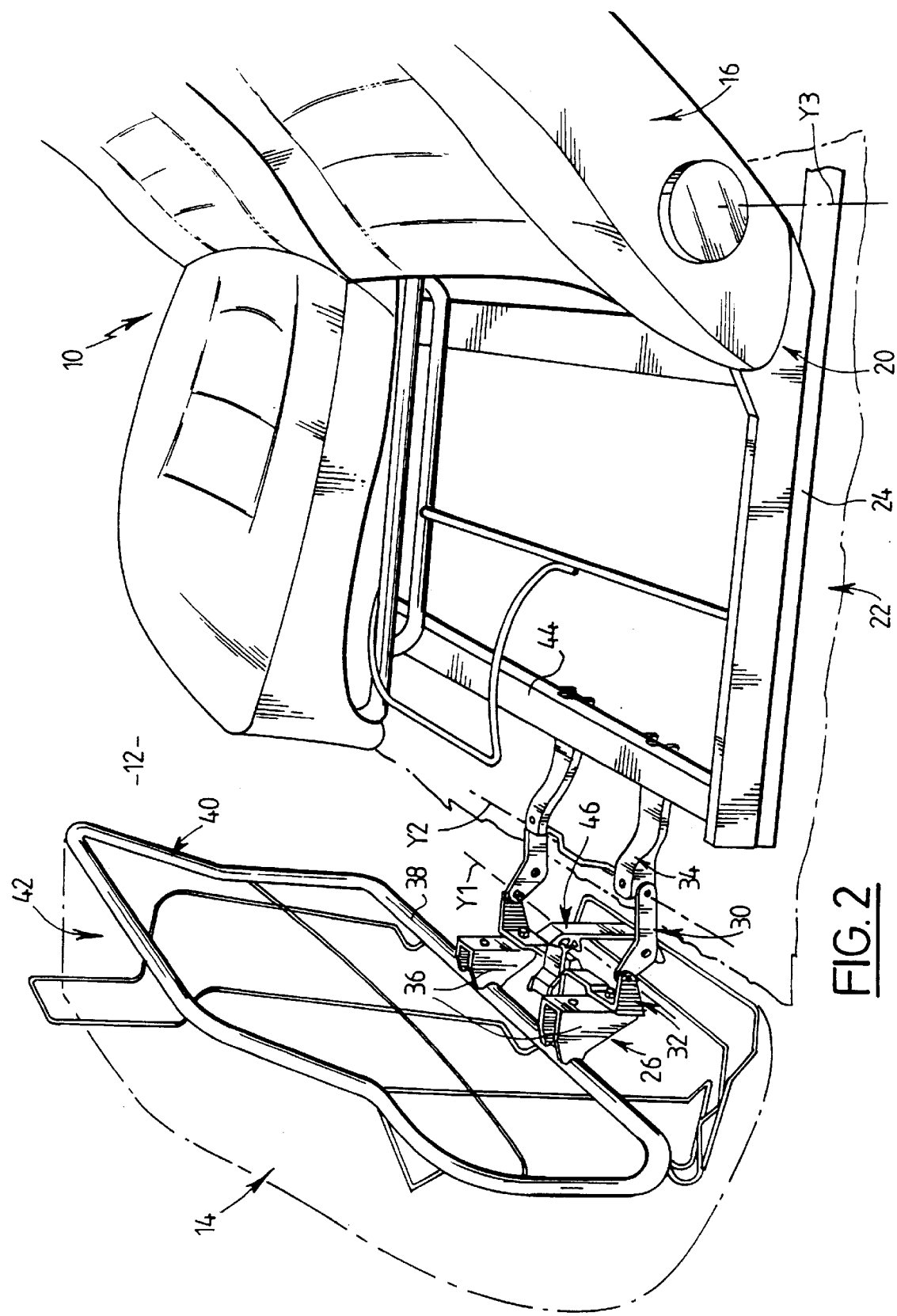
FIG. 2 is a perspective view of the bench seat depicted in FIG. 1, in which part of the seat cushion is in the tipped-up position.

FIGS. 1 and 2 depict a rear bench seat 10 arranged according to the invention in a cabin 12 of a motor vehicle.

In the conventional way, the bench seat 10 comprises a seat cushion 14 and a backrest 16 surmounted by headrests 18.

The seat cushion 14 and the backrest 16 are each split into two parts—a left-hand part and a right-hand part—of unequal width. The proportions of these parts are approximately ⅓–⅔.

The bench seat 10 also comprises a framework 20 on which the seat cushion 14 and the backrest 16 are mounted in articulated fashion (see FIG. 2). This framework 20 is, for example, connected to a floor 22 of the cabin using conventional means 24 for adjusting the longitudinal position of the bench seat.

In what follows, the terms seat cushion 14 and backrest 16 denote the left-hand parts of these elements.

The seat cushion 14 and the framework 20 comprise respective front ends which are articulated together by an assembly 26 forming a hinge with two essentially horizontal axes of articulation Y1, Y2 transverse to the bench seat 10. This assembly 26 forming a hinge allows the seat cushion to be pivoted between a normal position of use as depicted in FIG. 1 in which it is folded down essentially horizontally on the framework 20, and a tipped-up position as depicted in FIG. 2 in which it extends essentially vertically so as to free up its normal space.

The backrest 16 is articulated to the framework 20 about an essentially horizontal axis Y3 transverse to the bench seat 10, so that it can be moved between an upright position in which this bench seat is in use, as depicted in FIGS. 1 and 2, and a folded-down position (not depicted) in which it occupies the space left free by the seat cushion once the latter is in the tipped-up position. In the upright position, the backrest 16 forms, for example, a partition between a luggage compartment 28 and the cabin 12 of the vehicle. In the folded-down position, the backrest 16 allows the volume of this luggage compartment 28 to be increased.

The assembly 26 forming a hinge comprises an articulation assembly 30 which has a first end articulated, about the axis Y1, to a moving assembly 32 secured to the seat cushion 14, and a second end articulated, about the axis Y2, to a fixed assembly 34 secured to the framework 20.

The figures, particularly 2 and 3, illustrate one embodiment of the articulation assembly 30, the moving assembly 32 and the fixed assembly 34. In this example, the moving assembly 32 comprises a yoke with two branches 32A, 32B connected by a web 32C. This web 32C is connected by bolts to angle brackets 36 welded to a front crossmember 38 of a moving tubular frame 40 of the seat cushion 14. This frame 40 bears the padding 42 of the seat cushion 14. The fixed assembly 34 comprises a pair of arms 34A, 34B fixed by bolts to a front crossmember 44 of the framework 20. The articulation assembly 30 comprises a pair of link rods 30A, 30B articulated to free ends of the pairs of branches 32A, 32B and arms 34A, 34B.

The moving assembly 32 bears a hook 46 intended to cooperate with the crossmember 44 of the framework 20 so as to retain the seat cushion 14 in the normal position in the event of the vehicle experiencing a rear impact that would tend to lift the front end of the seat cushion with respect to the front end of the framework 20.

As a preference, the hook 46 is made of plastic and has the overall shape of an anchor (see FIGS. 3 to 7). This hook has a flexible shank 48 which has a free end and an end for connecting to an attachment member 50 attached, for example by snap-fastening, to a central part bent into a U of the web 32C. The attachment member 50, which extends the shank 48, is formed as an integral part of the hook 46.

The free end of the hook 46 has a retaining arm 52 intended to cooperate with the crossmember 44, and a locking arm 54, intended to cooperate with an additional locking stop 56 formed, as a preference, on the attachment member 50.

An operating member forming a handgrip 58 is formed as an integral part of the free end of the shank 48. The handgrip 58 protrudes from the front of the seat cushion 14 when this seat cushion is in the normal position, so as to be accessible to a user as depicted in FIG. 1.

Figure 3:
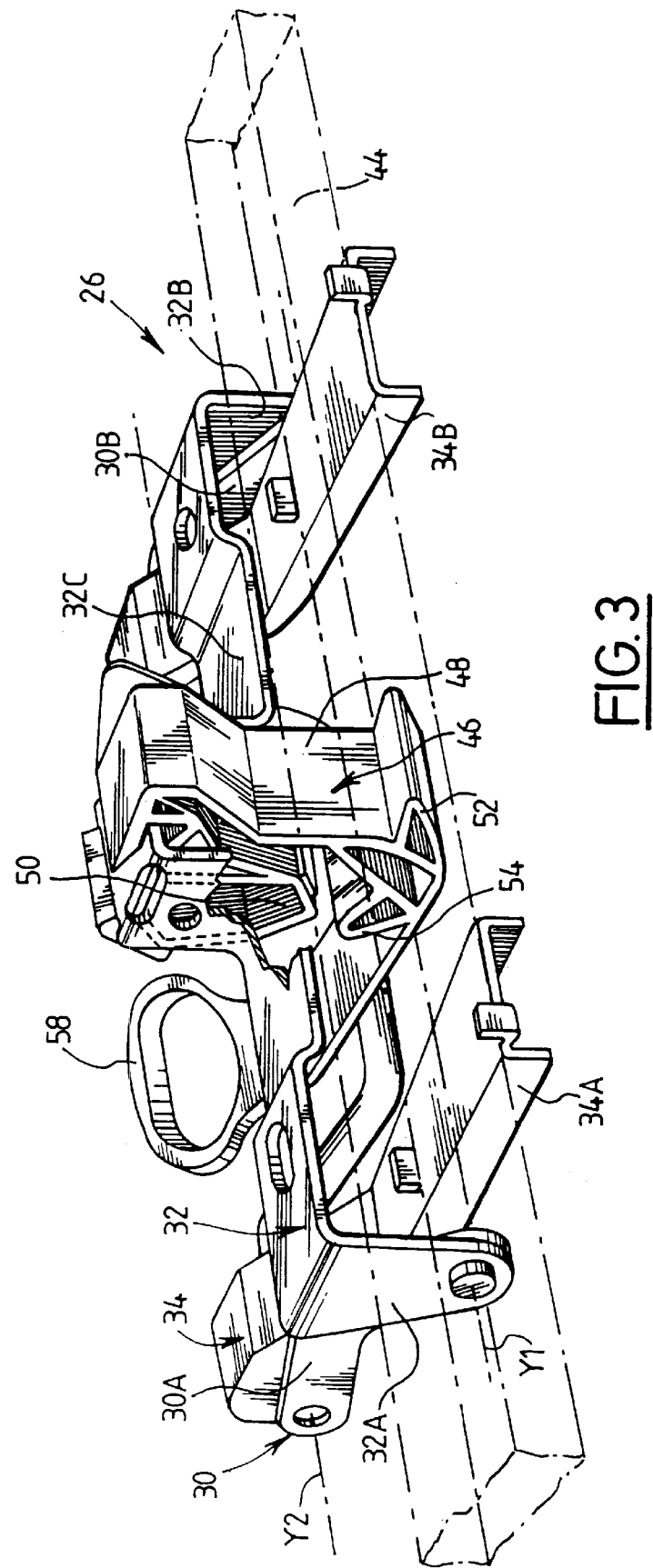
FIG. 3 is a perspective view of the assembly forming a hinge connected to that part of the seat cushion which is in the tipped-up position in FIG. 2.
Figure 4:
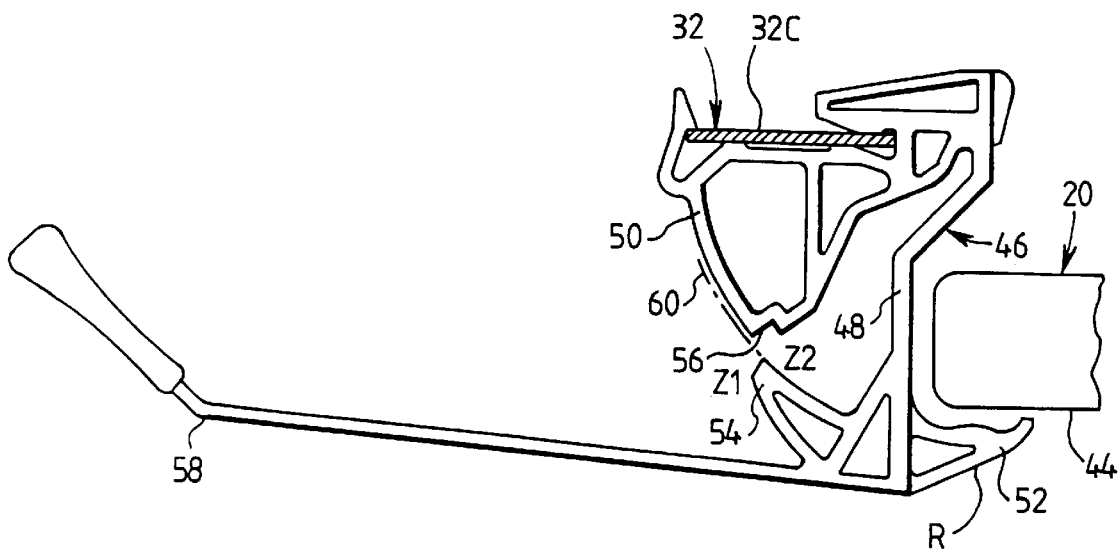
FIGS. 4 to 6 are side views of the hook for retaining the assembly forming a hinge depicted in FIG. 3, the locking arm of this hook being respectively in an operational standby position, a position disengaged from the crossmember of the support, and a locking position which works by cooperation with this crossmember.

The handgrip 58 allows the hook 46 to be disengaged from the crossmember 44 when this hook is in an operational standby position as depicted in FIGS. 3 and 4. Furthermore, a ramp R delimiting the retaining arm 52 allows this hook 46 to be placed in its operational standby position by retracting it by cooperation with the crossmember 44 when the seat cushion 14 is moved from its tipped-up position into its normal position.

As a preference, when the hook 46 is in the operational standby position, the retaining arm 52 is slightly separated from the crossmember 44 by a vertical clearance.

By flexing the shank 48, the locking arm 52 can move in two regions Z1, Z2 from its operational standby position as illustrated in FIGS. 3 and 4. In this FIG. 4, an imaginary line 60 separating these regions Z1, Z2 has been depicted in chain line.

Figure 5:
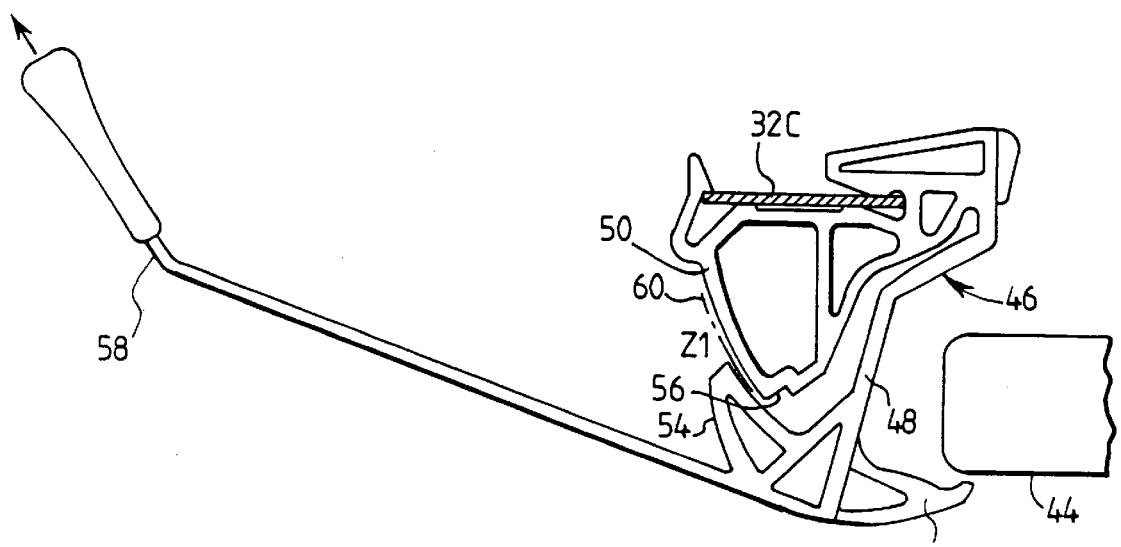

When the handgrip 58 is pulled, the unlocking arm 54 is urged essentially at right angles to the shank 48 so as to orientate this locking arm 54 towards a first empty region Z1 in which it moves to allow the retaining arm 52 to disengage from the crossmember 44, as is illustrated in FIG. 5. It will be noted that the movement of the locking arm 54 in the region Z1 results from the flexing of the shank 48 about an imaginary axis close to the connection end of this shank 48.

Figure 6:
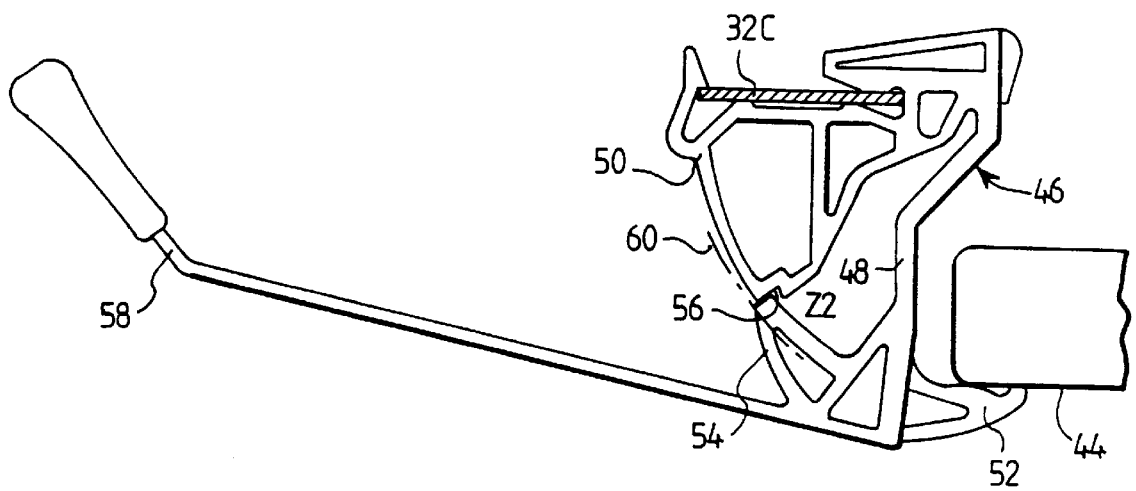
Figure 7:
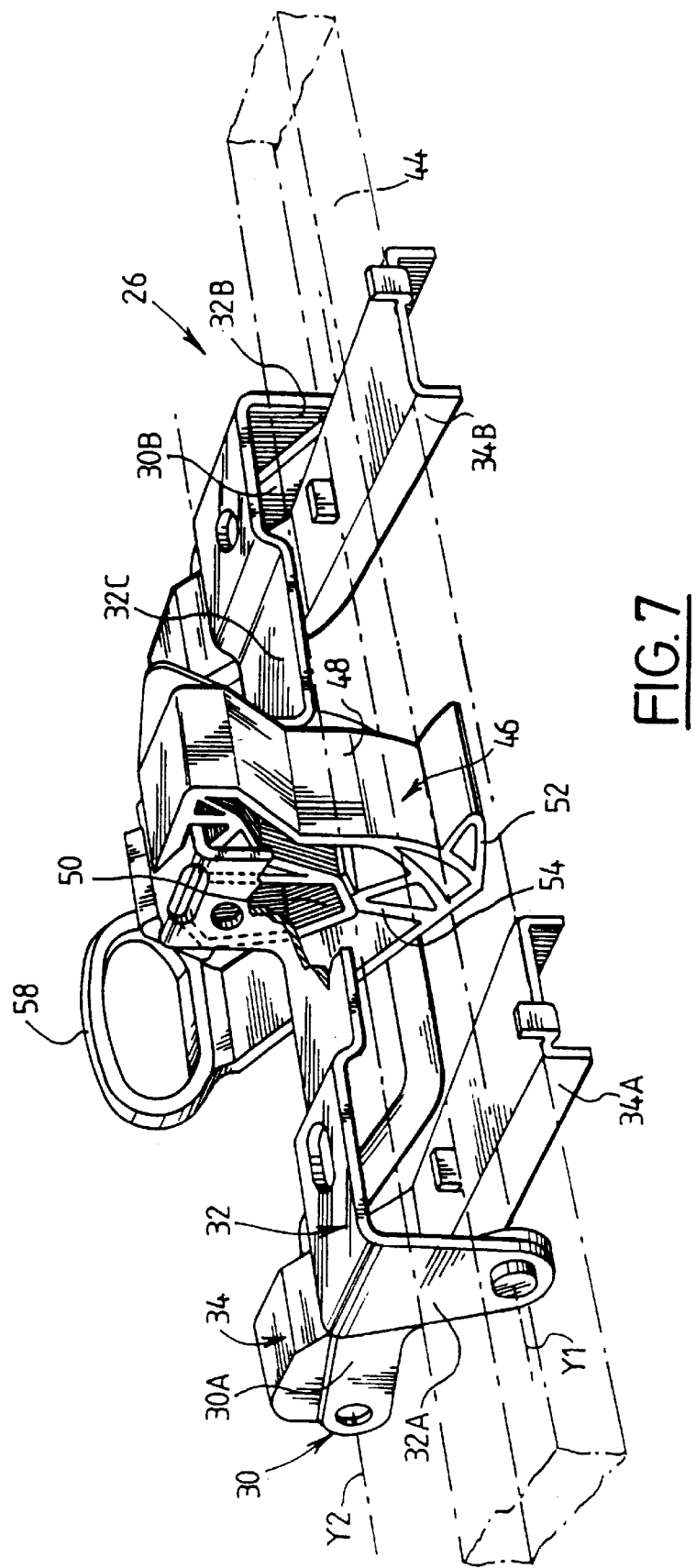
FIG. 7 is a view similar to FIG. 3, in which the locking arm of the hook is in the locked position.

In the event that the seat cushion 14 experiences an impact which would tend to lift its front end with respect to the crossmember 44, the latter cooperates with the retaining arm 52 so as to orientate the locking arm 54 towards the second region Z2 in which this arm 54 moves until it comes into contact with the stop 56, as is illustrated in FIGS. 6 and 7. The locking arm 54 is then immobilized in such a way as to keep the retaining arm 52 engaged with the crossmember 44.

It will be noted that the movement of the locking arm 54 in the region Z2 is the result of the flexing of the shank 48 about an imaginary axis close to the free end of this shank.

The main stages in the operation of the seat cushion 14 arranged according to the invention will be specified below.

Initially, this seat cushion 14 is in its normal position of use as illustrated in FIG. 1.

To place the seat cushion 14 in its tipped-up position as illustrated in FIG. 2, the user grasps hold of the handgrip 58 and pulls on it, and this has the effect of causing the locking arm 54 to move in the first empty region Z1 and to disengage the hook 46 from the crossmember 44, as is illustrated in FIG. 5.

By continuing to pull on the handgrip 58, which is connected to the yoke of the moving assembly 32 via the hook 46, the user causes, on the one hand, the yoke to pivot about the axis Y1, and, on the other hand, the link rods 30A, 30B to pivot about the axis Y2, so as to lift the front end of the seat cushion 14 and disengage the rear end of this seat cushion 14 from the bottom of the backrest 16.

The lifting of the front end of the seat cushion 14 is followed by a movement of this seat cushion 14 towards the front of the vehicle by continuing the pivoting of the link rods 30A, 30B about the axis Y2.

Finally, the user takes hold of the rear end of the seat cushion 14 to bring it into its tipped-up position as depicted in FIG. 2.

To return the seat cushion 14 to its normal position of use, the user in the conventional way returns this seat cushion 14 to an essentially horizontal position and pushes on the front end of this seat cushion to cause the hook 46 to retract through cooperation between the ramp R and the crossmember 44. Following retraction, this hook 46 returns automatically to its operational standby position as depicted in FIG. 4 under the effect of the elastic return force of the flexible shank 48.

If the seat cushion 14 experiences an impact which would tend to lift its front end with respect to the crossmember 44, the hook 46 locks as described earlier so as to keep the retaining arm 52 engaged with the crossmember 44 and thus prevent accidental lifting of the front end of the seat cushion with respect to this crossmember 44.

The invention is not restricted to the embodiment illustrated in the figures.

In particular, the plastic hook illustrated in the figures may be replaced by a metal hook intended to cooperate with the crossmember 44 or by any other means of retaining the seat cushion in the normal position in the event of this seat cushion experiencing an impact which would tend to lift its front end with respect to the front end of the framework 20.

Furthermore, the invention may be applied to any vehicle seat other than a rear bench seat.

Among the advantages of the invention, it will be noted that the single plastic component comprising the hook 46, the attachment member 50 of this hook and the handgrip 58 is lightweight, simple and inexpensive to manufacture and, in the event of impact, allows the seat cushion to be retained effectively in the normal position of use.

What is claimed is:

1. An arrangement of a motor vehicle seat on a support, said vehicle seat comprising a seat cushion and a seat back mounted independently on said support, the seat cushion extending between a rear end and a front end, the front end of said seat cushion being articulated on an articulation end of said support by a hinge assembly including at least a link rod which is pivotally mounted to the said front end of the seat cushion on a first horizontal articulation axis and to said support on a second horizontal articulation axis, said hinge assembly being movable between:
   a normal position of use in which the first articulation axis is situated rearwardly of said second articulation axis and in which said seat cushion lies horizontally and has said rear end thereof engaged under said seat back, and
   an active position in which said first articulation axis is moved forwards relative to said normal position of use, and in which said rear end of said seat cushion is no longer engaged under said seat back, said link rod being adapted to lift said first articulation axis at least when said first articulation axis leaves said normal position of use towards said active position, and said seat cushion being adapted to be pivoted in a tipped-up position when said hinge assembly is in said active position;
   said arrangement further comprising a retaining device which is movable between:
   a retaining position, in which said retaining device prevents said front end of said seat cushion from being lifted when said hinge assembly is in said normal position of use, thus retaining said hinge assembly in said normal position of use and preventing said seat cushion from being pivoted in said tipped-up position, and
   a non-retaining position in which said front end of said seat cushion is permitted to be lifted, thus enabling said hinge assembly to be moved from said normal position of use to said active position and then to pivot the seat cushion t its tipped-up position.

2. The arrangement according to claim 1, wherein the retaining device comprises a hook (46) borne by said front end of the seat cushion (14) and cooperating with a crossmember (44) on the articulation end of the support (20).

3. The arrangement according to claim 2, wherein the retaining device also comprises a handgrip (58) for disengaging the hook (46) from the crossmember (44), this handgrip being connected to this hook (46).

4. The arrangement according to claim 2, wherein the hook (46) is delimited by a ramp (R) for retracting this hook (46) by cooperation with the crossmember (44).

5. The arrangement according to claim 2, wherein the hook (46) is made of plastic.

6. The arrangement according to claim 1, wherein said link rod has a first end articulated, about said first axis of articulation (Y1), to a moving assembly (32) secured to the seat cushion (14), and a second end articulated, about a second end articulated, about said second axis of articulation (Y2), to a fixed assembly (34) secured to the support (20).

7. An arrangement of a motor vehicle seat cushion (14) on a support (20), of the type in which the seat cushion (14) and the support (20) have respective ends articulated together by an assembly (26) forming a hinge with two essentially horizontal axes of articulation (Y1, Y2) so as to allow the seat cushion (14) to be pivoted between a normal position of use in which it is folded down on the support (20), and a tipped-up position in which it frees its normal spaces, the arrangement comprising further additional means (44, 46) for retaining the seat cushion (14) in the normal position in the event of this seat cushion (14) experiencing an impact which would tend to lift its articulation end with respect to the articulation end of the support (20), these retaining means (44, 46) being borne by the articulation ends of the support (20) and of the seat cushion (14);
   wherein the additional retaining means comprise a hook (46) borne by the articulation end of the seat cushion (14) and cooperating with a crossmember (44) delimiting the articulation end of the support (20);
   wherein the hook (46) is made of plastic; and
   wherein the hook (46) has the overall shape of an anchor comprising a flexible shank (48), a retaining arm (52) intended to cooperate with the crossmember (44) and a locking arm (54) intended to cooperate with an additional locking stop (56) borne by the seat cushion (14), it being possible for the locking arm (54) to move as a result of the flexing of the shank (48),
   on the one hand, in a first empty region (Z1) towards which this locking arm (54) faces, by urging it essentially at right angles to the shank (48), so as to allow the retaining arm (52) to disengage from the crossmember (44),
   and on the other hand, in a second region (Z2) of cooperation with the locking stop (56), towards which this locking arm (54) faces, by cooperation between the crossmember (44) and the retaining arm (52) in the event of an impact so as to keep the retaining arm (52) engaged with the crossmember (44).

8. The arrangement according to claim 7, wherein the additional retaining means also comprise a handgrip (58) for disengaging the hook (46) from the crossmember (44), this handgrip being connected to this hook (46), and wherein the handgrip (58) is formed as an integral part of a free end of the shank (48) that bears the retaining arm (52) and the locking arm (54).

9. The arrangement according to claim 7, wherein the locking stop (56) is formed on an extension of the shank (48) forming a member (50) for attaching the hook (46) to the seat cushion (14).

10. An arrangement of a motor vehicle seat cushion (14) on a support (20), of the type in which the seat cushion (14) and the support (20) have respective ends articulated together by an assembly (26) forming a hinge with two essentially horizontal axes of articulation (Y1, Y2) so as to allow the seat cushion (14) to be pivoted between a normal position of use in which it is folded down on the support (20), and a tipped-up position in which it frees its normal space, the arrangement comprising further additional means (44, 46) for retaining the seat cushion (14) in the normal position in the event of this seat cushion (14) experiencing an impact which would tend to lift its articulation end with respect to the articulation end of the support (20), these retaining means (44, 46) being borne by the articulation ends of the support (20) and of the seat cushion (14);

wherein the assembly (26) forming a hinge comprises an articulation assembly (30) which has a first end articulated, about a first axis of articulation (Y1), to a moving assembly (32) secured to the seat cushion (14), and a second end articulated, the about the second axis of articulation (Y2), to a fixed assembly (34) secured to the support (20; and wherein the moving assembly (32) comprises a yoke which has two branches (32A, 32B) connected together by a web (32C), wherein the fixed assembly (34) comprises a pair of arms (34A, 34B) and wherein the articulation assembly (30) comprises a pair of link rods (30A, 30B) articulated to the pairs of branches (32A, 32B) and arms (34A, 34B).

* * * * *